UNITED STATES PATENT OFFICE.

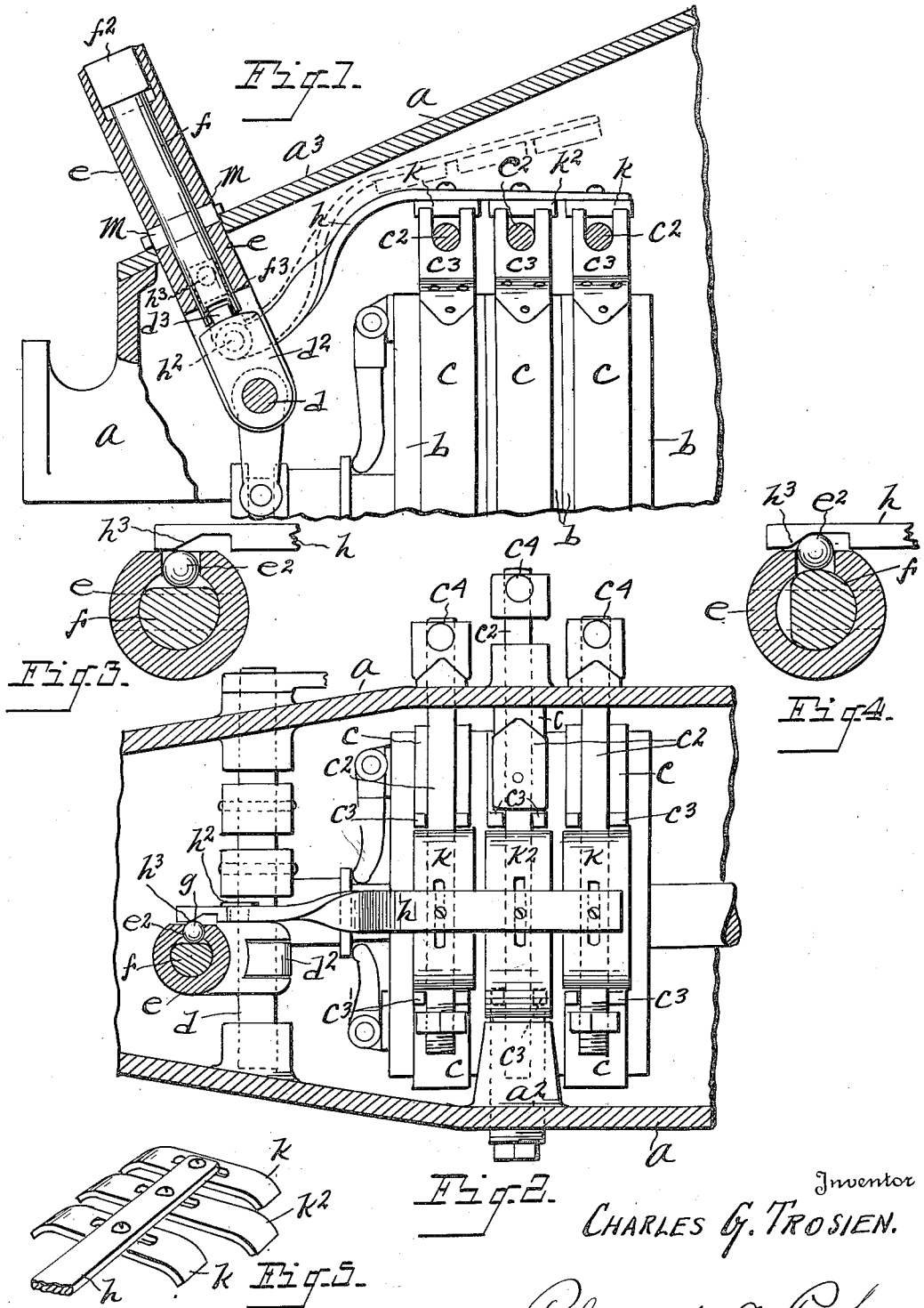

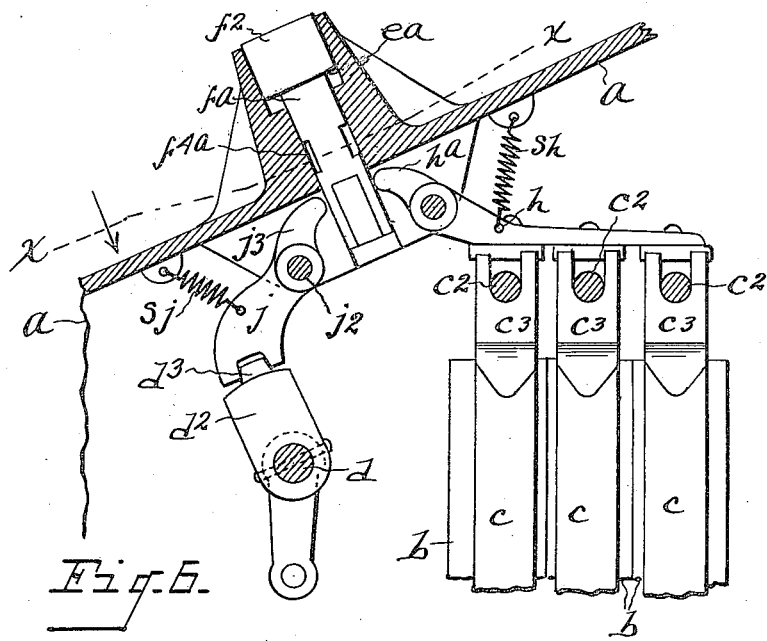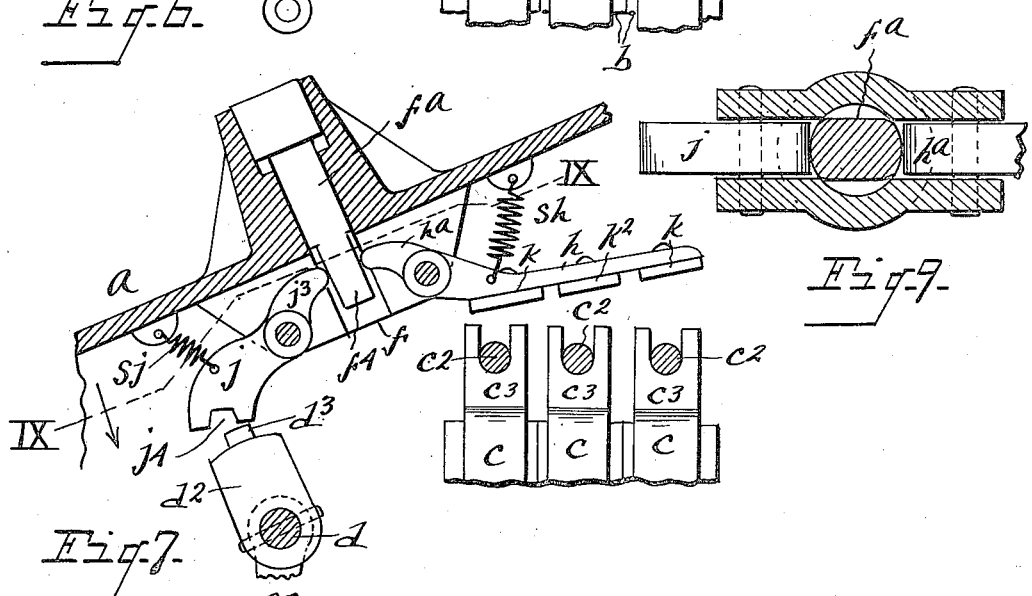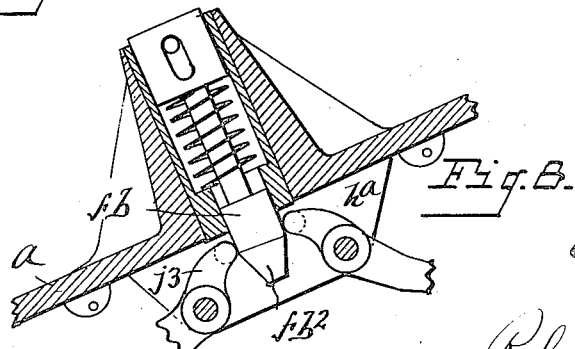

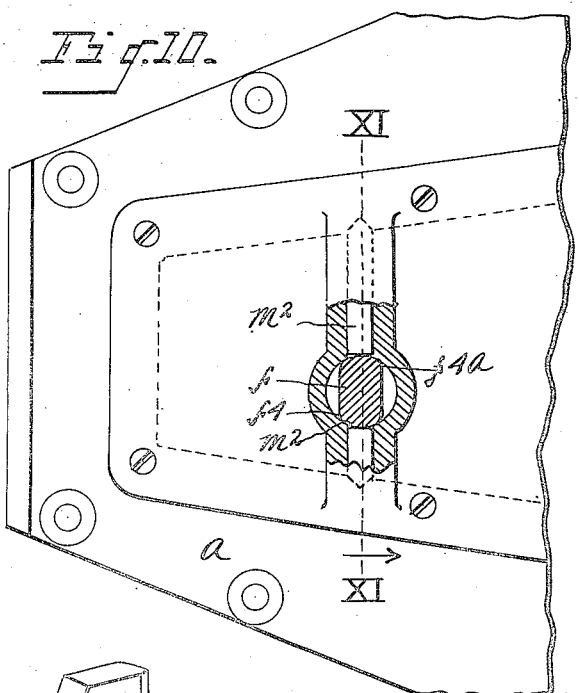
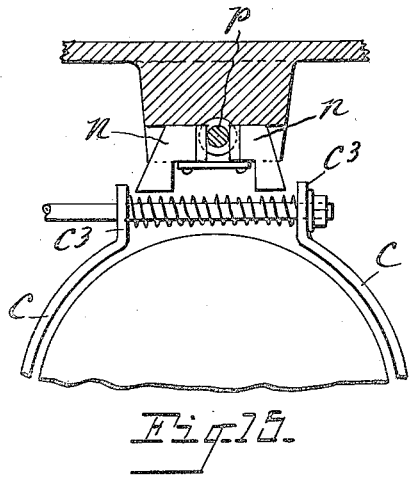
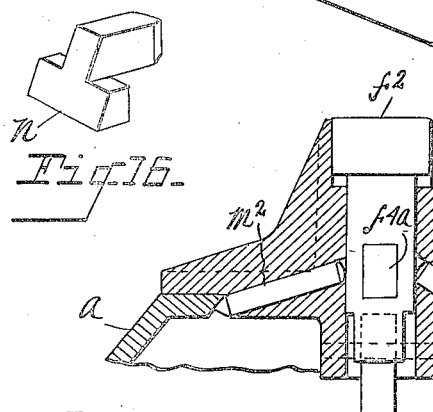
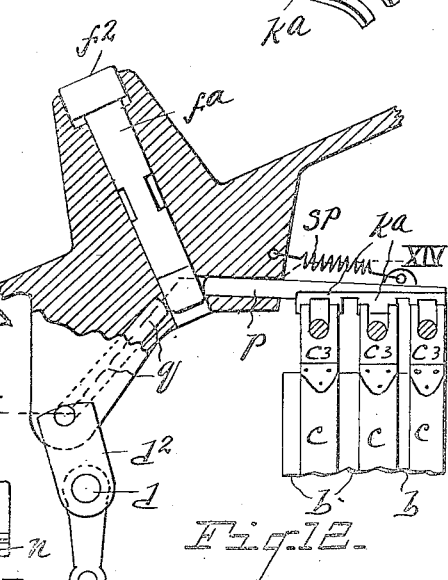
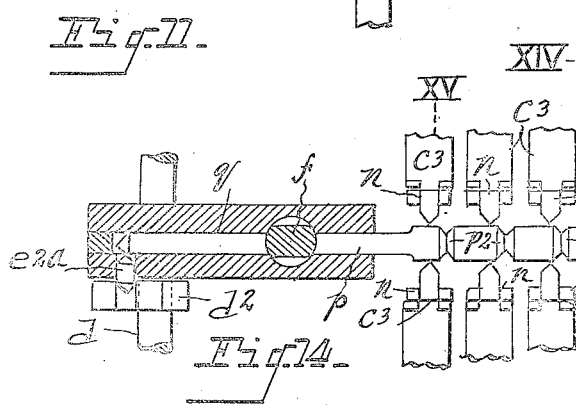
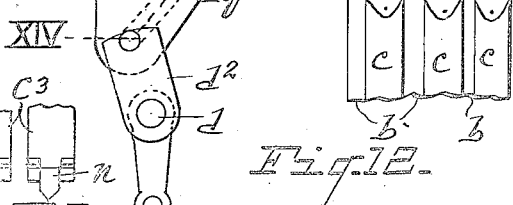
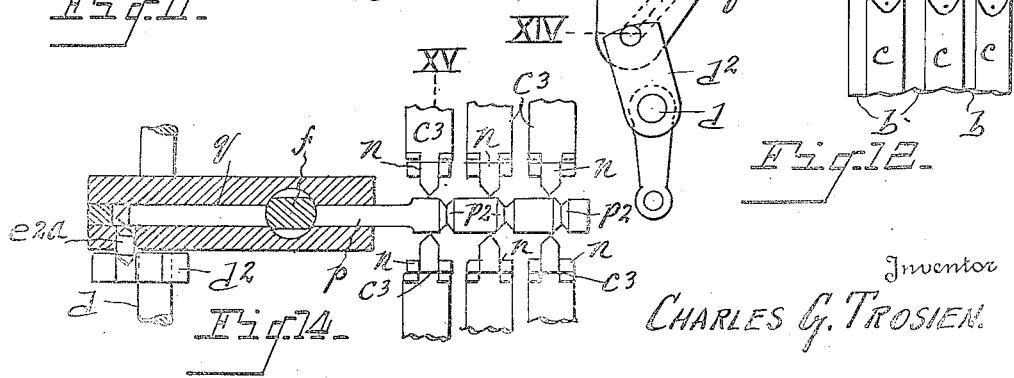

CHARLES G. TROSIEN, OF PONTIAC, MICHIGAN.

GEAR LOCK FOR AUTOMOBILES.

1,414,716.   Specification of Letters Patent.   Patented May 2, 1922.

Application filed December 12, 1919. Serial No. 344,279.

*To all whom it may concern:*

Be it known that I, CHARLES G. TROSIEN, a citizen of the United States, residing at Pontiac, county of Oakland, State of Michigan, have invented a certain new and useful Improvement in Gear Locks for Automobiles, and declare the following to be a full, clear, and exact description of the same, such as will enable others skilled in the art to which it pertains to make and use the same, reference being had to the accompanying drawings, which form a part of this specification.

My invention relates to gear locks for automobiles and the special object of my improvements is to provide an improved lock for the Ford automobile. In this construction there is a rock-shaft actuating the clutch and various means for controlling the planetary gearing. Both are engaged by the mechanism embodying my invention.

In the device illustrated in the accompanying drawings,—

Figure 1 is an elevation partly in section of a part of the change-speed gear casing with an apparatus embodying my invention attached thereto.

Fig. 2 is a horizontal section of the casing and attached apparatus.

Figs. 3 and 4 are detail sections showing different positions of a part of the operative parts.

Fig. 5 is a detail perspective view showing the end of the rod bearing the stop plates.

Fig. 6 is a view similar to Fig. 1 showing a modified construction.

Fig. 7 is a view similar to Fig. 6, a part of the apparatus being omitted and the other operative parts being shown in an alternative position.

Fig. 8 is a modified construction of the device shown in Figs. 6 and 7.

Fig. 9 is a detail section on the line IX—IX, Fig. 7.

Fig. 10 is a partial section on the line X—X, Fig. 6.

Fig. 11 is a detail section on the line XI—XI, Fig. 10.

Fig. 12 is a second modification of the locking mechanism.

Fig. 13 is a perspective view of one of the stop plates used in the form of the device shown in Fig. 12.

Fig. 14 is a modification of the construction shown in Fig. 12.

Fig. 15 is a detail cross-sectional view on the plane indicated by the line XV—XV, Fig. 14.

Fig. 16 is a perspective view of one of the stops used in the form shown in Figs. 13 and 14.

$a$ indicates the casing of the change-speed gearing. $b$ indicates the drums by which the planetary gearing is controlled. $c, c, c$ are the brake bands adapted to engage the periphery of the drum $b$. $c^3$ indicates terminal lugs on the bands $c$. $c^2, c^2, c^2$ are guide bars and actuating rods for the brake bands. $c^4, c^4, c^4$ are the actuating levers by which the brake bands are actuated through the rods $c^2, c^2, c^2$; $d$ is the rock shaft by which the clutch is actuated. $d^2$ is a cam piece upon the rock shaft $d$ having a lug $d^3$ extending radially outward from its periphery, which lug is adapted to be engaged by the cam or cam nut on the end of a rotating rod $f$ bearing in the casing $e$, which, at its lower end engages over the rod $d$ and it then extends outward from said rod through the cover of the change speed gear casing $a$. The rod $f$ is provided with a pin-lock $f^2$ at its outer end. This latter construction is more fully described in my pending application filed Nov. 7, 1919 and having Serial No. 336,406.

$h$ is a lever arm pivoted at $h^2$ to the lower end of the casing $e$ and extending over the drums $b$ between the lugs $c^3$ on opposite ends of the brake bands $c$. $k, k^2, k$ are stop plates secured to the lever arm $h$ and adapted, when the arm $h$ falls, to interpose themselves in the line of travel of the lugs $c^3$ so as to prevent the movement of said lugs and, consequently, the tightening of the brake bands $c$. Each of the two plates $k, k$ is simply interposed between lugs $c^3$ on opposite ends of its brake band, but the plate $k^2$ is interposed between a lug $a^2$ extending inward from the wall of the casing $a$ and the lug $c^3$ on the opposite side of the casing.

The lever $h$ is provided with a cam $h^3$ (Figs. 2, 3, and 4) and there is a steel ball $e^2$ engaging and adapted to reciprocate in an aperture in the cylindrical casing $e$ and to be actuated by a cam on the rod $f$ when the rod $f$ is turned from the position shown in Fig. 3.

The ball $e^2$ may enter into the aperture in the casing $e$, as shown in Fig. 3, and be out of the line of travel of the cam $h^3$ on the lever $h$; said lever then falls by gravity interposing the plates $k, k^2, k$ in the line of travel of the rods $c^3$ so as to prevent the actuation of any of the brake bands $c$. Thus the automobile is effectively locked so it cannot be used.

When the rod $f$ is turned, as above described, to permit the lever arm $h$ to fall, the lug $d^3$ on the plate $d^2$ is engaged by the lower end of the rod $f$ so as to prevent the rocking of the shaft $d$, as described in my application above referred to. Thus the clutch actuating parts are locked at the disengaged position of the clutch.

In Fig. 1, I have shown two opposite, radially-extending apertures in the wall of the casing $e$ in which fit pins $m, m$. The rod $f$ is cut away to form a cam adjacent to the pins $m, m$ so that in one position of the rod $f$ said pins may enter into said apertures and leave the cover $a^3$ free to be removed, while in the other position of the rod $f$ said pins are protruding, as shown in Fig. 1, binding the cover upon the gear casing.

Figs. 6 and 7 show a modified construction in which a rod $fa$ is pivoted in the casing $ea$ on the change speed gear casing $a$ and there is a lever arm $h$ similar to that shown in Fig. 1, but pivoted at a different point and having an arm $ha$ extending into the line of travel of the cam on the lower end of the rod $fa$. There is also a pivoted lever $j$ having an arm $j^3$ similar to the arm $ha$ upon the opposite side of the cam $f^4$ of the rod $fa$ and having at its lower end a cavity $j^4$ adapted to engage over the lug $d^3$. There is a retracting spring $sh$ for the lever arm $h$ and $sj$ for the lever arm $j$. When the rod $fa$ is turned to one position the lever arms $j$ and $h$ are raised out of engagement as shown in Fig. 7. When turned to the other position said lever arms are rotated about their pivots carrying the stop plates $k, k^2, k$ on the arm $h$ into the line of travel of the lugs $c^3$ as previously described and engaging the lug $d^3$ as shown in Fig. 6 to prevent rotation of the shaft $d$. The shaft $f$ may have a cam formed in it at $f^4$ and reciprocating locking bolts $m^2$ (Figs. 10 and 11) may be provided so that said bolts shall be actuated to engage the casing $a$ and hold the cover, or casing, $ea$ in engagement with the first-mentioned casing.

Instead of having a lever arm $h$ rotating or rocking upon a pivot, a reciprocating rod $p$ may be used, as shown in Fig. 12, having stop plates $ka$ (Fig. 13) upon it, these plates being preferably forked at their ends, as shown. At one position of the rod $p$ the lugs $c^3$ are free to move; at another position the salient portions of the ends of the plates $ka$ are interposed in the line of travel of the lugs $c^3$ to prevent the movement of the latter.

$sp$ is a retracting spring for the rod $p$. $q$ is a reciprocating rod adapted to be actuated by a cam at the lower end of the rod $fa$ and having at its end remote from rod a chamfered form at which point it engages a locking bolt $e^2a$ which reciprocates in a stationary aperture and when thrust outward engages in an aperture in the cam plate $d^2$ to prevent the rocking of the rod $d$, as shown in Fig. 14.

Instead of the rotating rod $fa$ actuating the levers $j$ and $h$, the reciprocating rods $p$ and $q$, and reciprocating rod $fb$ having a chamfered lower end $fb^2$ may obviously be used, as shown in Fig. 8.

In all the forms the plate $k^2$, or its plate corresponding thereto, is arched over a lug $c^3$ at one end and engages a stationary part, as $a^2$, connected to the frame. The reason for this is that in the form shown the middle brake may be adjusted from the outside of the casing so that if the stop plate simply engaged between a pair of lugs $c$ it would be possible to operate the low speed even when the plate was interposed between the lugs $c^3$ on the controlling brake band.

Instead of reciprocating a rod $p$ carrying stop plates $ka$, as above described and illustrated in Figs. 12 and 13, the reciprocating rod $p$ may be provided with cam surfaces or grooves $p^2$ and stationary reciprocating parts $n$ carrying lugs may be arranged with their inner ends adjacent to the rod $p$ and adapted to be actuated by cams on said rod, as illustrated in Figs. 14, 15 and 16. When the cam grooves are opposite the ends of the rods $n$, said rods are free to permit the movement of the lug $c^3$. When the rod $p$ is moved to another position, as shown in Fig. 14, the rods $n$ are thrust outward and prevent the movement of the rod $c^3$, thus locking the various bands.

What I claim is:

1. In a change-speed gearing having a brake-band, as one of its operative elements, a stop adapted to be interposed in the line of movement of one end of said band and means for interposing said stop in the line of travel of the end of said band and removing it therefrom at will.

2. In a change-speed gearing having a brake band as one of its operative elements, a stop adapted to be interposed in the line of movement of one of the ends of said band and means for interposing said stop in the line of travel of the end of said band and removing it therefrom at will, and means for locking said stop in its engaged position.

3. In a change-speed gearing having a brake band as one of its operative elements, a stop adapted to be interposed in the line of movement of one of the ends of said band, means for actuating said stop to interpose it in the line of travel of the end of said band or remove it therefrom, a clutch-actuating shaft, said means being adapted to lock said clutch-actuating shaft when said stop is in its engaged position.

4. In a change-speed gearing having a brake band as one of its operative elements, a stop adapted to be interposed in the line of movement of one of the ends of said band, means for actuating said stop to interpose it in the line of travel of the end of said band or remove it therefrom, a clutch-actuating shaft, said means being adapted to lock said clutch-actuating shaft when said stop is in its engaged position, a reciprocating bolt, a gear casing and cover therefor, said bolt being adapted to lock said cover on said casing, said actuating means being adapted to actuate said bolt for the purpose described.

5. In an apparatus of the kind described, a transmission gearing, a casing for said gearing, a rock shaft forming a part of said gearing, a planetary apparatus forming a part of said gearing, a rotatable rod bearing in the wall of said casing and extending through the same, means whereby said rod shall engage said rock shaft at one angular position and disengage the same at another angular position, and means whereby the rotation of said rod shall lock said planetary apparatus.

6. In an apparatus of the kind described, a transmission gearing, a casing for said gearing, a rock shaft forming a part of said gearing, a planetary apparatus forming a part of said gearing, a rotatable rod bearing in the wall of said casing and extending through the same, means whereby said rod shall engage said rock shaft at one angular position and disengage the same at another angular position, a reciprocating rod carrying lugs adapted to lock said planetary apparatus, and means whereby the rotation of the first-mentioned rod shall actuate said reciprocating rod for the purpose described.

7. In an apparatus of the kind described, a transmission gearing, a casing for said gearing, a rock shaft forming a part of said gearing, a planetary apparatus forming a part of said gearing, a rotatable rod bearing in the wall of said casing and extending through the same, means whereby said rod shall engage said rock shaft at one angular position and disengage the same at another angular position, and means whereby the rotation of said rod shall lock said planetary apparatus, a cover for said casing, a bolt adapted to lock said cover upon said casing, and means whereby the rotation of said rod shall actuate said bolt.

8. In a locking device, the combination of a transmission mechanism, having a plurality of friction bands with means for simultaneously locking said friction bands against operation.

9. In a locking device, the combination of a transmission mechanism, having a plurality of friction bands with means for simultaneously locking said friction bands against operation, means for normally holding said first means in inoperative position.

10. In a change-speed gearing having a brake band as one of its operative elements, a pivotally mounted stop adapted to be interposed in the line of movement of one end of said band and means for interposing said stop in the line of travel of the end of said band and removing it therefrom at will.

11. The combination with a transmission having friction bands, of means for holding said bands against contraction, said means comprising a hingedly supported plate having stops adapted to engage the ends of said bands to hold the same against contraction, means to depress said plate, and a lock for controlling said depressing means.

12. The combination with a transmission having a friction band and a clutch operating rock shaft, of a locking device for holding said band against contraction, means associated with said locking device for holding said rock shaft against rotation, and operating means for said locking device.

13. In combination with the friction clutch of an automobile and its operating mechanism, a housing associated therewith and provided with an opening, a member removably mounted on said housing at said opening, and locking mechanism carried by said member and co-operating with said clutch to lock the latter in released position, said locking mechanism including a locking member which when in locking position prevents the removal of said member.

14. In combination with the friction clutch of an automobile and its operating mechanism, a housing associated therewith and provided with an opening, a member removably mounted on said housing at said opening, and locking mechanism carried by said member and co-operating with said clutch to lock the latter in a predetermined position, said locking mechanism including a locking member which when in locking position prevents the removal of said member.

In testimony whereof, I sign this specification.

CHARLES G. TROSIEN.